US012352085B2

(12) United States Patent
Marsden

(10) Patent No.: US 12,352,085 B2
(45) Date of Patent: Jul. 8, 2025

(54) GATE HINGE

(71) Applicant: Elbee Pty Ltd., Bondi Junction (AU)

(72) Inventor: Andrew Marsden, Hingham, MA (US)

(73) Assignee: Elbee Pty Ltd., Bondi Junction (AU)

( * ) Notice: Subject to any disclaimer, the term of this patent is extended or adjusted under 35 U.S.C. 154(b) by 0 days.

(21) Appl. No.: 18/139,200

(22) Filed: Apr. 25, 2023

(65) Prior Publication Data

US 2023/0349214 A1 Nov. 2, 2023

Related U.S. Application Data

(60) Provisional application No. 63/336,488, filed on Apr. 29, 2022.

(51) Int. Cl.
*E05F 1/14* (2006.01)
*E05D 3/02* (2006.01)
(Continued)

(52) U.S. Cl.
CPC ............ *E05D 11/1014* (2013.01); *E05D 3/02* (2013.01); *E05D 7/1044* (2013.01);
(Continued)

(58) Field of Classification Search
CPC ........... E05D 7/06; E05D 7/04; E05D 7/0423; E05D 7/1044; E05D 3/02; E05D 11/1014;
(Continued)

(56) References Cited

U.S. PATENT DOCUMENTS 165,619 A * 7/1875 Sanderson .......... E05D 11/1014 16/318
1,127,825 A 2/1915 Swank
(Continued)

FOREIGN PATENT DOCUMENTS

CN 105178829 B 2/2017
DE 19638551 C1 * 1/1998 ......... E05D 11/1007
(Continued)

OTHER PUBLICATIONS

[No Author Listed], Regalo Top of Stairs Gate Installation (Model #1250). RegaloBaby YouTube Channel. Https://www.youtube.com/watch?v=u46GzucNH_Y. Uploaded Sep. 19, 2019. 1 page.

*Primary Examiner* — Chuck Y Mah
(74) *Attorney, Agent, or Firm* — Wolf, Greenfield & Sacks, P.C.

(57) ABSTRACT

A gate includes a gate barrier, an upper hinge configured to rotatably support the gate barrier about a rotation axis, and a lower hinge configured to rotatable support the gate barrier about the rotation axis. The upper hinge portion may include a first upper hinge portion having a first receptacle and a first ramp disposed adjacent the first receptacle, and a second upper hinge portion having an upper hinge projection configured to engage the first receptacle to inhibit rotation of the first upper hinge portion. The lower hinge may include a first lower hinge portion coupled to the gate barrier, the first lower hinge portion having a receptacle and a lower hinge projection extending from a base of the receptacle, and a second lower hinge portion having an annular projection configured to engage the receptacle and receive the lower hinge projection.

18 Claims, 8 Drawing Sheets

(51) Int. Cl.
*E05D 7/10* (2006.01)
*E05D 11/10* (2006.01)
*E05D 15/58* (2006.01)
*E06B 9/04* (2006.01)
*E06B 9/00* (2006.01)

(52) U.S. Cl.
CPC .............. *E05D 15/581* (2013.01); *E06B 9/04* (2013.01); *E05D 2015/587* (2013.01); *E06B 2009/002* (2013.01)

(58) Field of Classification Search
CPC .......... E05D 15/581; E05D 2007/0461; E05D 2007/0484; E05D 2007/0438; E05D 2007/0446; E05D 2015/587; E06B 9/04; E06B 11/022; E06B 11/02; E06B 11/04; E06B 2009/002; E05Y 2900/40; E05Y 2900/402
See application file for complete search history.

(56) References Cited

U.S. PATENT DOCUMENTS

| | | | | | |
|---|---|---|---|---|---|
| 1,294,044 | A | * | 2/1919 | Garman et al. | E05D 11/1007 16/351 |
| 2,542,696 | A | | 2/1951 | Nelson | |
| 2,585,152 | A | | 2/1952 | Merchant | |
| 3,263,365 | A | * | 8/1966 | Eckel | E05F 1/1223 16/314 |
| 3,546,736 | A | * | 12/1970 | Booth | E05F 1/063 16/312 |
| 4,083,591 | A | | 4/1978 | Parisien | |
| 4,697,306 | A | * | 10/1987 | Rhodes | E05F 1/063 256/26 |
| 5,138,796 | A | | 8/1992 | Grainger | |
| 5,369,842 | A | * | 12/1994 | Beatty | F25D 23/028 16/317 |
| 5,797,218 | A | | 8/1998 | Holland | |
| 6,112,461 | A | | 9/2000 | Cheng | |
| D434,054 | S | | 11/2000 | Luke | |
| 6,516,568 | B2 | | 2/2003 | Yang | |
| 6,715,182 | B2 | | 4/2004 | Cheng | |
| 7,240,400 | B2 | | 7/2007 | Bonham | |
| 7,291,300 | B2 | | 10/2007 | Anderson et al. | |
| 7,373,755 | B2 | | 5/2008 | Jefferys et al. | |
| D583,070 | S | | 12/2008 | Lai | |
| 7,874,103 | B2 | | 1/2011 | Yates | |
| 8,341,886 | B2 | | 1/2013 | Yates | |
| 8,413,300 | B1 | | 4/2013 | Luneborg | |
| 8,615,928 | B2 | | 12/2013 | Wang | |
| 9,097,050 | B2 | | 8/2015 | Yates | |
| 9,366,075 | B2 | | 6/2016 | Marsden et al. | |
| 9,394,726 | B1 | | 7/2016 | Flannery et al. | |
| D789,774 | S | | 6/2017 | Turk | |
| 9,677,310 | B1 | | 6/2017 | Russo et al. | |
| 9,739,523 | B1 | * | 8/2017 | Augsburger | E05D 3/02 |
| 10,024,080 | B2 | | 7/2018 | Marsden | |
| 10,415,290 | B1 | | 9/2019 | Flannery et al. | |
| 10,550,634 | B1 | | 2/2020 | Holland | |
| 10,683,699 | B2 | | 6/2020 | Wang | |
| 10,745,941 | B2 | | 8/2020 | Fang et al. | |
| 10,907,404 | B1 | | 2/2021 | Flannery et al. | |
| 10,934,768 | B2 | | 3/2021 | Flannery et al. | |
| 10,975,621 | B2 | | 4/2021 | Gentil | |
| 11,041,340 | B1 | | 6/2021 | Flannery et al. | |
| D924,434 | S | | 7/2021 | Ye | |
| 11,118,398 | B2 | | 9/2021 | Kaiser et al. | |
| 11,149,488 | B2 | | 10/2021 | Wang | |
| 11,162,300 | B1 | | 11/2021 | Flannery et al. | |
| D945,017 | S | | 3/2022 | Yang et al. | |
| 11,346,130 | B1 | | 5/2022 | Timothy | |
| D957,001 | S | | 7/2022 | Su | |
| D987,216 | S | | 5/2023 | Zhao | |
| 11,686,150 | B1 | | 6/2023 | Flannery et al. | |
| 11,808,084 | B2 | | 11/2023 | Marsden | |
| 11,814,892 | B1 | | 11/2023 | Flannery et al. | |
| D1,021,146 | S | | 4/2024 | Marsden | |
| D1,048,854 | S | | 10/2024 | Marsden | |
| 2002/0007597 | A1 | | 1/2002 | Wang | |
| 2003/0005643 | A1 | | 1/2003 | Yang | |
| 2003/0009945 | A1 | | 1/2003 | Cheng | |
| 2004/0045222 | A1 | | 3/2004 | Hicks | |
| 2006/0175028 | A1 | | 8/2006 | Askinasi | |
| 2007/0131921 | A1 | | 6/2007 | Monahan et al. | |
| 2009/0013604 | A1 | | 1/2009 | Yates | |
| 2009/0013606 | A1 | | 1/2009 | Yates | |
| 2011/0225890 | A1 | | 9/2011 | Greenwood et al. | |
| 2014/0007506 | A1 | | 1/2014 | Huang | |
| 2014/0215762 | A1 | * | 8/2014 | Mitchell | E05D 11/0054 16/374 |
| 2015/0027060 | A1 | | 1/2015 | Sousa et al. | |
| 2015/0101253 | A1 | | 4/2015 | Marsden et al. | |
| 2017/0058594 | A1 | | 3/2017 | Marsden | |
| 2017/0058595 | A1 | | 3/2017 | Marsden | |
| 2017/0073998 | A1 | | 3/2017 | Fang et al. | |
| 2017/0211314 | A1 | | 7/2017 | Raffi et al. | |
| 2019/0136619 | A1 | | 5/2019 | Flannery et al. | |
| 2019/0194977 | A1 | | 6/2019 | Sander | |
| 2020/0063488 | A1 | | 2/2020 | Wang | |
| 2021/0062550 | A1 | | 3/2021 | Zhang | |
| 2021/0238899 | A1 | | 8/2021 | Marsden et al. | |
| 2023/0349206 | A1 | | 11/2023 | Marsden | |

FOREIGN PATENT DOCUMENTS

| | | | | | |
|---|---|---|---|---|---|
| EM | 000761440-0001 | S | | 8/2007 | |
| EM | 008033120-0001 | S | | 7/2020 | |
| EM | 008028328-0001 | S | | 8/2020 | |
| GB | 2 268 210 | A | | 1/1994 | |
| GB | 2359114 | A | * | 8/2001 | E05F 1/063 |
| JP | 2001173306 | A | * | 6/2001 | |

* cited by examiner

GATE HINGE

RELATED APPLICATIONS

This application claims the benefit of priority under 35 U.S.C. § 119(e) to U.S. Provisional Application No. 63/336,488, filed on Apr. 29, 2022, which is herein incorporated by reference in its entirety.

FIELD

Disclosed embodiments are related to safety gates and more specifically to gate hinge assemblies and related methods of use.

BACKGROUND

Safety gates are often employed to restrict or inhibit access to a certain area for a child or pet. Such safety gates may employ a latch and hinge arrangement that allow an adult to open the safety gate, while inhibiting a child from opening the gate. For example, a gate can be installed to help prevent a young child from accessing areas of a house, and a gate latch and gate hinge can be configured to allow an adult to perform one or more steps to open the gate barrier.

SUMMARY

In some embodiments, a gate hinge includes an upper hinge portion configured to support a gate barrier. The upper hinge portion includes a first receptacle, a first ramp disposed adjacent the first receptacle, where the first ramp is inclined downward away from the first receptacle in a first direction, and a second ramp disposed adjacent the first receptacle, where the second ramp is inclined downward away from the first receptacle in a second direction opposite the first direction. The gate hinge also includes a lower hinge portion configured to support the upper hinge portion, where the lower hinge portion is configured to allow the upper hinge portion to rotate about a rotation axis and translate along the rotation axis, and where the lower hinge portion includes a first projection configured to engage the first receptacle to inhibit relative rotation of the upper hinge portion and the lower hinge portion.

In some embodiments, a gate hinge includes an upper hinge portion configured to support a gate barrier. The upper hinge portion includes a receptacle, and a receptacle projection extending from a base of the receptacle. The gate hinge also includes a lower hinge portion configured to support the upper hinge portion, where the lower hinge portion is configured to allow the upper hinge portion to rotate about a rotation axis, where the lower hinge portion includes an annular projection configured to engage the receptacle, and where the annular projection is further configured to receive the projection.

In some embodiments, a gate includes a gate barrier and an upper hinge configured to rotatably support the gate barrier about a rotation axis. The upper hinge includes a first upper hinge portion coupled to the gate barrier, the first upper hinge portion including a first receptacle, and a first ramp disposed adjacent the first receptacle, where the first ramp is inclined downward away from the first receptacle in a first direction. The upper hinge also includes a second upper hinge portion configured to support the first upper hinge portion, where the second upper hinge portion is configured to allow the first upper hinge portion to rotate about the rotation axis and translate along the rotation axis, where the second upper hinge portion includes an upper hinge projection configured to engage the first receptacle to inhibit relative rotation of the first upper hinge portion and the second upper hinge portion. The gate also includes a lower hinge configured to rotatably support the gate barrier about the rotation axis. The lower hinge includes a first lower hinge portion coupled to the gate barrier, the first lower hinge portion including a receptacle and a lower hinge projection extending from a base of the receptacle, and a second lower hinge portion configured to support the first lower hinge portion, where the second lower hinge portion includes an annular projection configured to engage the receptacle, and where the annular projection is further configured to receive the lower hinge projection.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
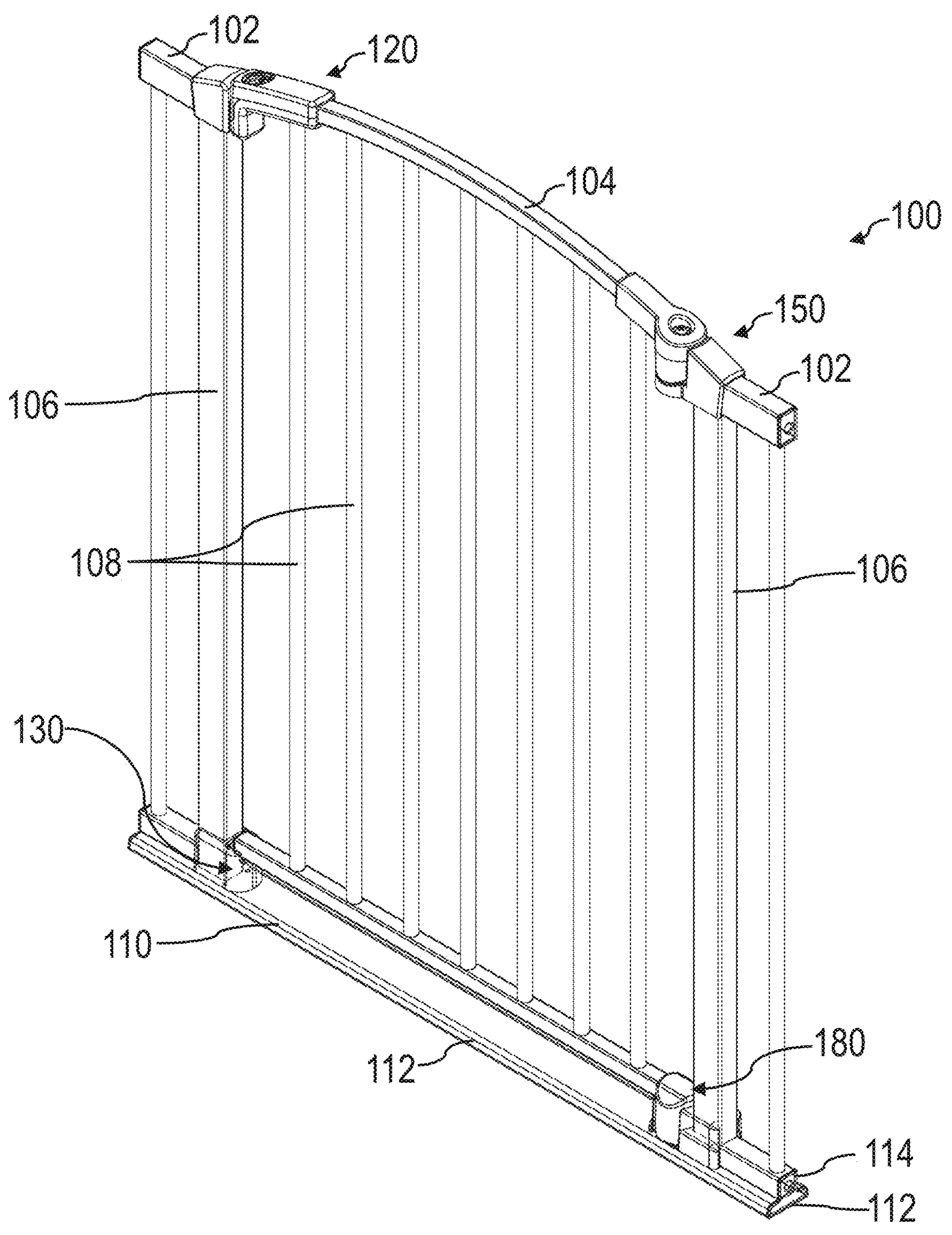
FIG. 1 is a perspective view of an embodiment of a gate in a first state.

Safety gates are often employed in access points (e.g., doorways) to help prevent children or pets from accessing certain areas. Such safety gates include a gate barrier that can be moved by an adult. Safety gates typically employ mechanisms to ensure that an adult can operate the gate, while inhibiting a child or pet from opening the gate. Some gate barriers swing when moving between an open and a closed position. In such swing gates, one side of the barrier is rotatably attached at an upper hinge and lower hinge so that the gate swings open and closed, and the other side has a latching arrangement to secure the barrier in the closed position. On the securing side of a gate, a gate latch may secure a gate barrier in place by retaining a latch member that extends from the gate barrier. On the hinge side of the gate, the gate may be liftable (e.g., in a direction along a rotation axis of the hinge). Some conventional hinges may employ a biasing arrangement configured to urge the gate barrier toward the closed position through at least a portion of the swing of the gate. Such biasing arrangement may employ internal ramps on which the gate barrier is suspended, which may result in increased wear reducing efficacy over time and less support for the gate barrier to resist external forces. Some conventional hinges also include hold-open features configured to hold the gate in the open position. In some instances, holding the gate barrier open may be undesirable as the access point may be accidentally left unsecure to a child or pet.

In view the above, the inventors have appreciated the benefits of a hinge arrangement for a safety gate that reliably biases a gate barrier toward a closed position from an open position. In particular, the inventors have recognized the benefits of an upper gate hinge configured to bias a gate barrier to the closed position when the gate barrier has been rotated 80 to 90 degrees from the closed position. Additionally, the inventors have appreciated the benefits of a hinge arrangement configured to lock the hinge in the closed position, such that a gate barrier must be lifted before the hinge arrangement allows rotation. The inventors have appreciated that such an arrangement improves the security of the gate against externally applied torques compared with relying on a latch alone. Furthermore, the inventors have appreciated the benefits of a hinge arrangement that is configured to resist external forces by employing contact surfaces in a hinge that are disposed on an exterior of the hinge. Such an arrangement may improve the capability of the hinge arrangement in resisting and transferring torques.

In some embodiments, a gate hinge may include an upper hinge portion configured to support a gate barrier, and a lower hinge portion configured to support the upper hinge portion. The lower hinge portion may be configured to allow the upper hinge portion to rotate so that the gate barrier may swing between a closed position and an open position. The lower hinge portion may also be configured to allow the upper hinge portion to translate within a range along a rotation axis of the gate hinge, such that the upper hinge portion may be lifted relative to the lower hinge portion. The upper hinge portion may include a first receptacle and a first ramp disposed adjacent the receptacle which is inclined downward away from the first receptacle in a first direction. In some embodiments, the first ramp may extend downward in a circumferential direction about the rotation axis. In some embodiments, the first receptacle may extend in a direction parallel to the rotation axis. The lower hinge portion may include a first projection configured to engage the first receptacle to inhibit relative rotation of the upper hinge portion and the lower hinge portion. That is, the first receptacle may receive the first projection such that the first projection and first receptacle interfere with one another and inhibit relative rotation of the upper hinge portion and the lower hinge portion. In some embodiments, when the upper hinge portion is in a closed position, the first projection may be aligned with the first receptacle such that the first projection can engage the first receptacle. In some embodiments, a user may lift the upper hinge (e.g., move the upper hinge away from the lower hinge portion) to remove the first projection from the receptacle to allow the upper hinge portion to rotate relative to the lower hinge portion. In some embodiments, the first projection may also be configured to engage the first ramp to lift the upper hinge when the upper hinge portion is rotated from the closed position to the open position. In some embodiments, the gate hinge may include a spring configured to bias the upper hinge portion toward the lower hinge portion.

In some embodiments, a method of operating a gate includes lifting an upper hinge portion relative to a lower hinge portion from a locked position to an unlocked position. In some embodiments, such lifting may be against the biasing force of a spring. Lifting the upper hinge portion relative to the lower hinge portion may disengage a projection disposed on the lower hinge portion from a receptacle disposed on the upper hinge portion. The method may also include engage a ramp of the upper hinge portion with the projection. The ramp may extend downward from the receptacle, such that engaging the ramp with the projection lifts the upper hinge portion relative to the lower hinge portion. The method may also include rotating the upper hinge portion relative to the lower hinge portion from a closed position to an open position when the upper hinge portion is in the unlocked position. Such a rotation may slide the projection along the ramp, which may further lift the upper hinge portion relative to the lower hinge portion. In the open position, the upper hinge portion may be at its highest position relative to the lower hinge portion. The ramp of the upper hinge portion may bias the upper hinge portion toward the closed position, such that releasing the upper hinge portion in the open position may cause the upper hinge portion to rotate to the closed position. In some embodiments, the method may include releasing the upper hinge portion when the upper hinge portion is in the open position to allow the upper hinge portion to rotate to the closed position. When the upper hinge portion reaches the closed position, the projection and the receptacle may be aligned, which may allow the receptacle to fall over the projection, allowing the hinge to move from the unlocked position to the locked position. In this manner, the upper hinge portion may be secured and unable to rotate in the locked and closed position.

In some embodiments, a lower gate hinge may include an upper hinge portion configured to support a gate barrier and a lower hinge portion configured to rotatably support the upper hinge portion. The lower hinge portion may allow the upper hinge portion to rotate between a closed position and one or more open positions. The lower hinge portion may also allow the upper portion to translate along its rotation axis to allow the gate barrier to be lifted. In cases where the lower gate hinge is employed with an upper gate hinge according to exemplary embodiments described herein, such an arrangement may allow the upper gate hinge to function by allowing a projection of the upper gate hinge to be removed from a receptacle in a translation direction parallel to a rotation axis of the lower gate hinge. The upper hinge portion may include a receptacle and a receptacle projection extending from a base of the receptacle. The receptacle may face downwards toward the lower hinge portion. In some embodiments, the combination of the receptacle and receptacle projection may form an annular opening which may receive an annular projection of the lower hinge portion. The lower hinge portion may include an annular projection configured to engage the receptacle and receive the receptacle projection. In this manner, the upper hinge portion may nest into the lower hinge portion, which results in a stronger support structure for the gate barrier. The annular projection may increase the diameter of the sliding surfaces engage with one another on the upper hinge portion and lower hinge portion, thereby increasing the strength of the hinge to externally applied forces by having a greater total engaged surface area. That is, by moving the engaging surfaces between the upper hinge portion and lower hinge portion away from the central axis, the lower gate hinge is stronger and more able to resist external forces.

In some embodiments, a receptacle projection may also function as an internal rotation stop for the gate, which may ensure a gate barrier does not open past a desired amount, and any biasing of the gate barrier toward a closed position is ensured without any external elements that may be accessible to a user. In some embodiments, the receptacle projection may include at least one tab extending in a radial direction. An annular protrusion of a lower hinge portion may include a corresponding shelf extending in a radial direction that is configured to engage the at least one tab of the receptacle projection. The shelf may inhibit rotation of the upper hinge portion relative to the lower hinge portion in one direction. In some embodiments, the annular protrusion may include a second shelf configured to function as a rotation stop in the opposing direction compared to the first shelf, such that a limited range of rotation can be provided for the upper gate portion. In some embodiments, an angle between a closed position of the upper hinge portion and an open position of the upper gate portion may be between 80 and 90 degrees. According to such embodiments, a total range of rotation of the upper hinge portion may be between 160 and 180 degrees between two open positions each defined by a stop (e.g., a shelf). Of course, any suitable range of rotation may be employed for a lower gate hinge, as the present disclosure is not so limited. Additionally, while in some embodiments the receptacle projection may include a tab and the annular projection may include a shelf, in other embodiments the annual projection may include a tab and the receptacle projection may include a shelf, as the present disclosure is not so limited.

According to exemplary embodiments described herein, components of a gate hinge may be integrally formed. For example, one or more components may be integrally molded (e.g., injection molded), 3D printed, or another suitable process. In some embodiments, an upper hinge portion of an upper gate hinge may be integrally molded, and a lower hinge portion of the upper gate hinge may be integrally molded. Likewise, in some embodiments, an upper hinge portion of a lower gate hinge may be integrally molded, and a lower hinge portion of the lower gate hinge may be integrally molded. Such an arrangement may simplify manufacturing of a gate hinge according to exemplary embodiments described herein.

According to exemplary embodiments described herein, a gate hinge may include one or more fasteners and one more springs. In some embodiments, the one or more fasteners may be employed to couple an upper hinge portion to a lower hinge portion. In some embodiments described herein, a binding post and barrel bolt may be employed to couple an upper hinge portion to a lower hinge portion. Of course, in other embodiments, other suitable fasteners may be employed, including binding posts, pins, screws, bolts, or rivets. In some embodiments described herein, a spring may be employed to bias a gate hinge component in a direction. For example, a spring may be employed to bias an upper hinge portion toward a lower hinge portion. In some embodiments, the spring may be a compression spring. In other embodiments, any suitable spring may be employed, including a tension spring, torsion spring, air spring, or another type of spring, as the present disclosure is not so limited. Additionally, while in some embodiments herein a spring is employed urge an upper hinge portion toward a lower hinge portion, in some other embodiments no spring may be employed and solely the effect of gravity may be employed to engage the upper hinge portion with the lower hinge portion, as the present disclosure is not so limited.

It should be noted that while in exemplary embodiments certain hinge arrangements may be configured as an upper hinge and other arrangements may be configured as a lower hinge, in other embodiments a hinge arrangement may be employed at any location on a gate, as the present disclosure is not so limited. For example, embodiments of an upper hinge described herein may be employed as a lower hinge. As another example, embodiments of a lower hinge described herein may be employed as an upper hinge.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a perspective view of an embodiment of a gate 100. The gate includes a frame 102 that is configured to be placed in an access point such as a doorway. In some embodiments, the frame 102 may be a pressure gate frame configured to be compressed between two walls or a frame of a doorway. In such embodiments, the frame may include clamps configured to engage the walls and/or jambs of a doorway. In other embodiments, the frame may be configured to be fastened to the access point (e.g., using a suitable fastener such as a screw) without being compressed in the access point. As shown in FIG. 1, the gate includes a gate barrier 104 which is configured to swing (e.g., rotate) between open and closed positions. In the embodiment of FIG. 1, the gate barrier is configured to swing from a closed position shown in FIG. 1 to either of two open positions. The gate 100 also includes vertical stiles 106 framing the opening occupied by the gate barrier 104. The gate barrier includes barrier stiles 108 that are configured to inhibit access for a pet or a small child. The gate 100 also includes a lower crossbeam 110. In some embodiments as shown in FIG. 1, the lower crossbeam is configured to provide a low-profile opening that reduces protruding elements that may make crossing through the gate difficult. According to the depicted embodiment, the lower crossbeam 110 includes a bottom beam 112 and an upper beam 114. The bottom beam 112 extends along and entire transverse length of the gate (e.g., in a longitudinal direction of the bottom beam 112) and has a small thickness relative to its width. The upper beam 114 is disposed on either side of the gate and may be employed to assist in fastening the lower crossbeam to an access point (e.g., via clamping or fasteners as discussed above). As shown in FIG. 1, the upper beam 114 has a greater thickness than the bottom beam 112, but also has a lesser width than the bottom beam.

According to the embodiment of FIG. 1, the gate 100 includes a hinge side and a latch side. On the latch side, the gate includes an upper latch 120. The upper latch may be configured to be operable by a user to secure or open the gate barrier 104. The gate includes a lower catch 130 configured to receive a portion of the gate barrier 104 and inhibit the gate barrier from rotating in the closed position. On the hinge side, the gate includes an upper hinge 150 and a lower hinge 180. The upper hinge 150 and the lower hinge 180 are configured to selectively allow the gate barrier 104 to rotate from the closed position to an open position. Additionally, in the embodiment of FIG. 1, the upper hinge and lower hinge are configured to allow the gate barrier to be lifted vertically (e.g., translated along an axis of rotation of the gate barrier).

Such a vertical lifting arrangement may selectively control the rotatability of the gate barrier, which makes the gate more secure and difficult to operate for a pet or small child. In some embodiments, the upper hinge may also function to bias the gate barrier 104 toward the closed position. The functionality and structure of the upper hinge 150 and lower hinge 180 will be discussed further below.

Figure 2:
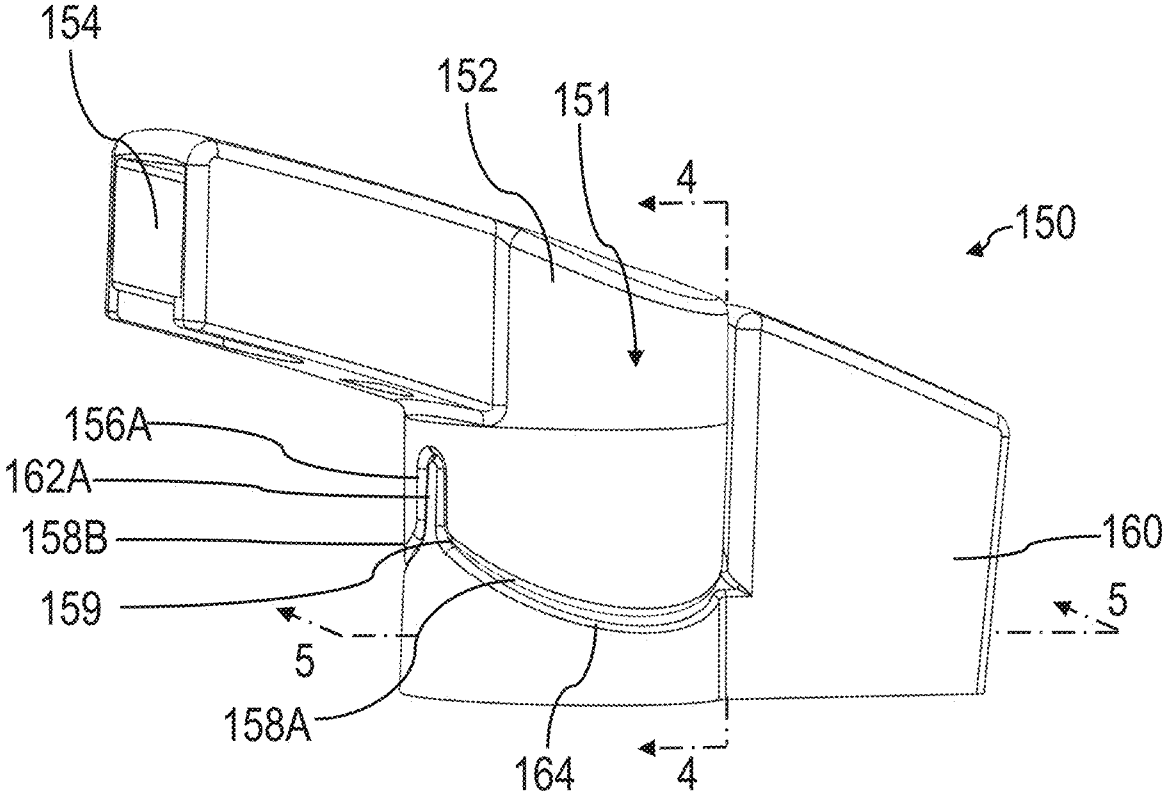
FIG. 2 is a perspective view of an upper hinge of the gate of FIG. 1.

FIG. 2 is a perspective view of an upper hinge 150 of the gate of FIG. 1 in a first state. As shown in FIG. 2, the upper hinge 150 includes an upper hinge portion 152 (e.g., a first portion of the upper hinge) and a lower hinge portion 160 (e.g., a second portion of the upper hinge). The upper hinge portion includes a gate barrier coupler 154 configured to couple the upper hinge portion to a gate barrier. The lower hinge portion 160 is configured to support the upper hinge portion 152 and allow the upper hinge portion to rotate. In the embodiment of FIG. 2, the lower hinge portion is also configured to allow the upper hinge portion to be translated along an axis of rotation of the upper hinge portion (e.g., lifted vertically), as will be discussed further with reference to FIGS. 5-7.

According to the embodiment of FIG. 2, the upper hinge 150 is configured to secure a gate barrier in a closed position to enhance the security of the gate. That is, the upper hinge 150 is configured to resist rotation of the gate barrier when the gate barrier is in the closed position. Accordingly, the gate barrier is not reliant on only the latch side of the gate to remain closed. As shown in FIG. 2, the upper hinge portion 152 includes a first receptacle 156A. The first receptacle extends in a direction parallel to a rotation axis of the upper hinge portion and is configured to receive a first projection 162A of the lower hinge portion 160, such that the first projection and the first receptacle engage in a direction parallel to the rotation axis. When the first projection 162A is engaged with the first receptacle 156A, the upper hinge portion may be inhibited from rotating relative to the lower hinge portion due to the interference between the first projection and the first receptacle. In some embodiments as shown in FIG. 2, the first receptacle 156A and the first projection 162A are externally disposed on the upper hinge portion 152 and the lower hinge portion 160. Such an arrangement may increase the radial distance between a rotation axis of the upper hinge portion and the first receptacle 156A and first projection 162A, giving the receptacle and projection more leverage to resist externally applied torques on a gate barrier. To allow the upper hinge portion 152 to rotate relative to the lower hinge portion 160, the upper hinge portion 152 may be translated along its rotation axis away from the lower hinge portion to disengage the first projection 162A from the first receptacle 156A. Once the first receptacle 156A and first projection 162A are disengaged, the upper hinge portion may be rotatable such that the upper hinge portion and associated gate barrier may be swung to an open position.

In the embodiment of FIG. 2, the upper hinge portion 152 is configured to bias a gate barrier to a closed position. That is, the upper hinge portion 152 is configured to bias itself toward a position in which the first receptacle 156A is aligned with the first projection 162A, such that the first projection 162A may engaged the receptacle under the effect of gravity and/or a biasing force to secure the gate barrier in a closed position. As shown in FIG. 2, the upper hinge portion includes a first ramp 158A and a second ramp 158B. The first ramp is disposed adjacent the first receptacle 156A and extends downwardly from the receptacle in a first circumferential direction. The second ramp is likewise disposed adjacent the first receptacle 156A and extended downward from the receptacle in a second circumferential direction opposite the first circumferential direction. The first ramp and the second ramp are each configured to engage the first projection 162A of the lower hinge portion 160 as the upper hinge portion rotates about its rotation axis in either a first direction or a second direction. As the upper hinge portion rotates, the engagement between the first projection 162A and either the first ramp 158A or the second ramp 158B causes the upper hinge portion to be moved further away from the lower hinge portion (e.g., lifted) as the upper hinge portion rotates. When the projection is in contact with either the first ramp or the second ramp and the upper hinge portion is released, the inclination of the ramp causes the upper hinge portion to rotate back toward a closed position. That is, the first ramp and second ramp are configured to urge the upper hinge portion back to a closed position when the upper hinge portion is forced against the first projection 162A. The force employed to urge the upper hinge portion back to the closed position may be generated in part by gravity acting on the gate barrier and upper hinge portion. The force may also include a biasing force from a spring, as will be discussed further in reference to FIG. 5. As shown in FIG. 2, the first ramp 158A and second ramp 158B transition to the first receptacle 156A at lead-ins 159, which may facilitate entry of the first projection 162A into the receptacle once the upper hinge portion is in the closed position.

According to the embodiment of FIG. 2, the lower hinge portion 160 includes a mating profile 164 configured to receive the first ramp 158A and the second ramp 158B. In some embodiments as shown in FIG. 2, the upper hinge portion 152 and the lower hinge portion form a barrel 151 formed by a lower barrel portion of the lower hinge portion and an upper barrel portion of the upper hinge portion. The mating profile is configured to eliminate gaps between the upper hinge portion and the lower hinge portion such that the barrel 151 does not contain gaps into which fingers or tools may be easily inserted while the gate is closed. In this manner, the gate may be more secure while in the closed position compared to gates including such gaps. Of course, in some embodiments the lower hinge portion may not include a mating profile 164, as the present disclosure is not so limited.

According to some embodiments, an upper hinge 150 may include multiple projections and multiple corresponding receptacles. In the embodiment of FIG. 2 and as will be shown and described in reference to FIGS. 3 and 4, an upper gate hinge may include a pair of receptacles and projections disposed on opposing sides of a rotation axis of the hinge (e.g., 180 degrees apart from one another). Such an arrangement may facilitate opening and closing of a gate as the two projections may provide multiple supporting surfaces for an upper hinge portion. Additionally, such an arrangement may improve the security of the gate in a closed position, as torque applied to the gate may be resisted on both sides of an axis of rotation. Of course, any suitable number of projections and receptacles may be employed, including a single projection and receptacle, as the present disclosure is not so limited.

Figure 3:
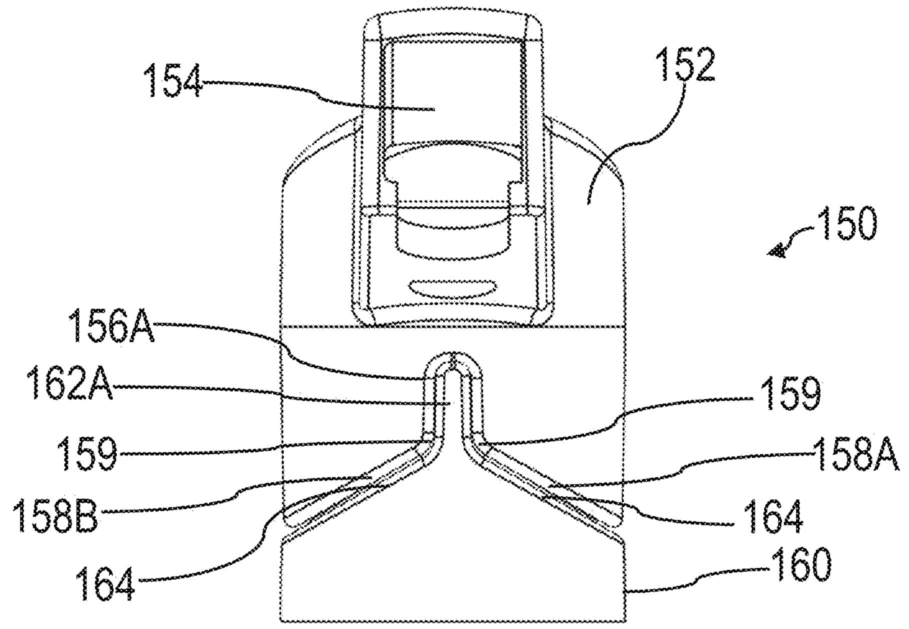
FIG. 3 is a first side view of the upper hinge of FIG. 2.

FIG. 3 is a first side view of the upper hinge 150 of FIG. 2 more clearly showing the first projection 162A and the first receptacle 156A. As shown in FIG. 2, the first receptacle 156A has received the first projection 162A, such that the upper hinge portion 152 is not able to rotate relative to the lower hinge portion 160. To allow the upper hinge portion to rotate, the upper hinge portion may be lifted and moved away from the lower hinge portion until the first projection 162A clears the first receptacle 156A. When the upper hinge portion is rotated in a first direction, the first projection 162A engages and slides along the first ramp 158A. The first ramp 158A is inclined downward away from the first receptacle 156A, such that the engagement between the projection and first ramp further lifts the upper hinge portion relative to the lower hinge portion. The first ramp 158A may extend over at least an 85 degree rotation of the upper hinge portion so that the first ramp may bias the upper hinge portion back to the closed position even from the open position. In some embodiments, the first ramp may extend over a 90 degree rotation of the upper hinge portion. When the upper hinge portion is rotated in the second direction, the first projection 162A engages the second ramp 158B. Like the first ramp, the second ramp 158B is inclined downward away from the first receptacle 156A, such that the engagement between the projection and second ramp further lifts the upper hinge portion relative to the lower hinge portion. The second ramp may extend along an angle equal to that of the first ramp.

Figure 4:
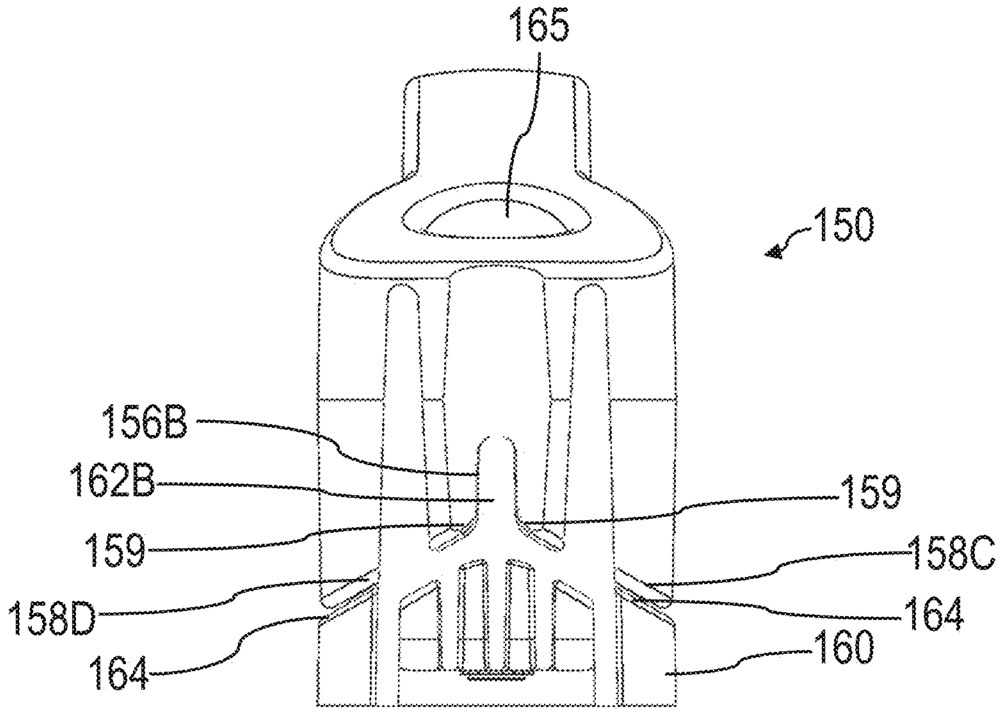
FIG. 4 is a cross-sectional view of the upper hinge of FIG. 2 taken along line 4-4.

FIG. 4 is a cross-sectional view of the upper hinge 150 of FIG. 2 taken along line 4-4 showing an opposing side of the upper hinge portion 152 and lower hinge portion 160. As shown in FIG. 4, the upper hinge portion includes a second receptacle 156B, and the lower hinge portion includes a second projection 162B. The second receptacle and second projection are disposed on an opposite side of a rotation axis of the upper hinge portion compared to the projection and receptacle shown in FIG. 3. As shown in FIG. 4, the upper hinge portion includes a third ramp 158C and a fourth ramp 158D, which function similarly to the first ramp and second ramp of FIG. 3. In some embodiments, the third ramp and the fourth ramp may extend approximately 90 degrees, such that each of the first ramp, second, ramp, third ramp, and fourth ramp extend approximately 90 degrees. In some embodiments, the first ramp and second ramp may extend a greater angle than the third and fourth ramp. For example, in some embodiments the first ramp and second ramp may each extend between 90 and 110 degrees. According to such an embodiment, only the first projection shown in FIG. 3 may be in contact with a ramp, and the third and fourth ramps may not be used such that the second projection does not interfere with the biasing force provided by the first projection. That is, the third and fourth ramps in such embodiments may not be engaged with the second projection 162B shown in FIG. 4.

Figure 5:
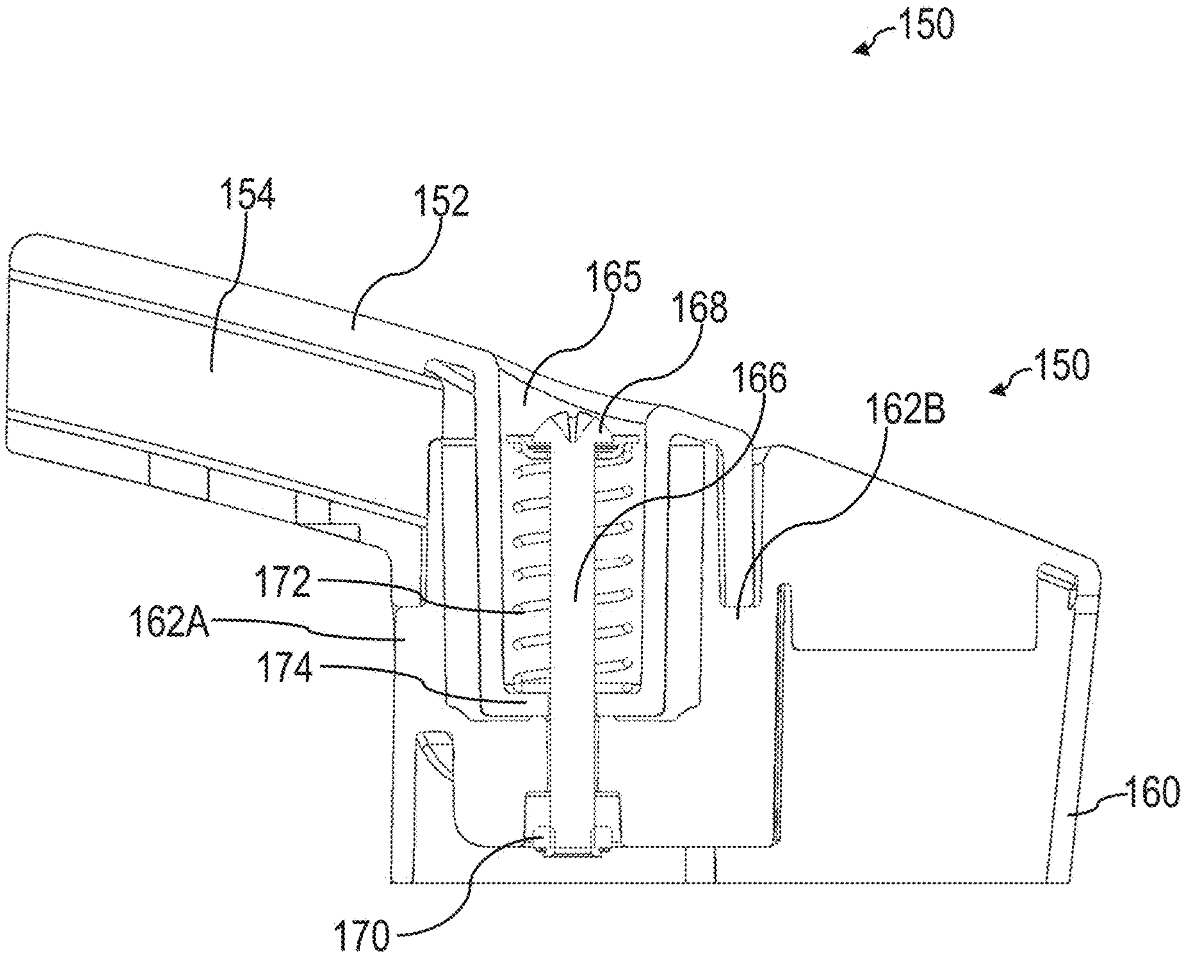
FIG. 5 is a cross-sectional view of the upper hinge of FIG. 2 taken along line 5-5.

FIG. 5 is a cross-sectional view of the upper hinge 150 of FIG. 2 taken along line 5-5 showing the internal arrangement of the upper hinge. In some embodiments as shown in FIG. 5, the upper gate hinge includes a spring configured to bias the upper hinge portion 152 toward the lower hinge portion 160. As shown in FIG. 5, the upper hinge portion includes an opening 165 which houses a fastener 166. The fastener of FIG. 5 is configured as a binding bolt including a head 168 and a nut 170. The fastener is configured to limit the amount of translation of the upper hinge portion relative to the lower hinge portion. That is, the fastener sets a limit for the upward travel of the upper hinge portion away from the lower hinge portion, thereby ensuring the upper hinge portion and lower hinge portion stay coupled.

As shown in FIG. 5, the upper hinge portion 152 houses a spring 172 configured as a compression spring in the depicted embodiment. The compression spring is disposed around the fastener 166 and is disposed between the head 168 and a base 174 of the upper hinge portion. Accordingly, the spring 172 is configured to apply an upward force to the head 168 of the fastener and a downward force to the base 174. As the head 168 is coupled to the lower hinge portion 160 by the nut 170, the upward force is applied to the lower hinge portion. Accordingly, the spring 172 biases the upper hinge portion 152 toward the lower hinge portion 160 by applying forces urging the two hinge portions together. When the upper hinge portion is lifted against the biasing force of the spring 172, the spring 172 compresses and applies a greater force urging the upper hinge portion toward the lower hinge portion. In this manner, the spring 172 ensures the upper hinge portion remains engaged with the lower hinge portion unless an active force (e.g., a force applied by the user) is applied to lift the upper hinge portion against the biasing force. The biasing force may also be employed to ensure any ramps are able to urge the upper hinge portion to rotate toward a closed position.

According to the embodiment shown in FIG. 5, the upper hinge portion 152 and the lower hinge portion 160 may each be integrally molded. In some embodiments, the fastener 166 and the spring 172 may be formed of metal.

Figure 6:
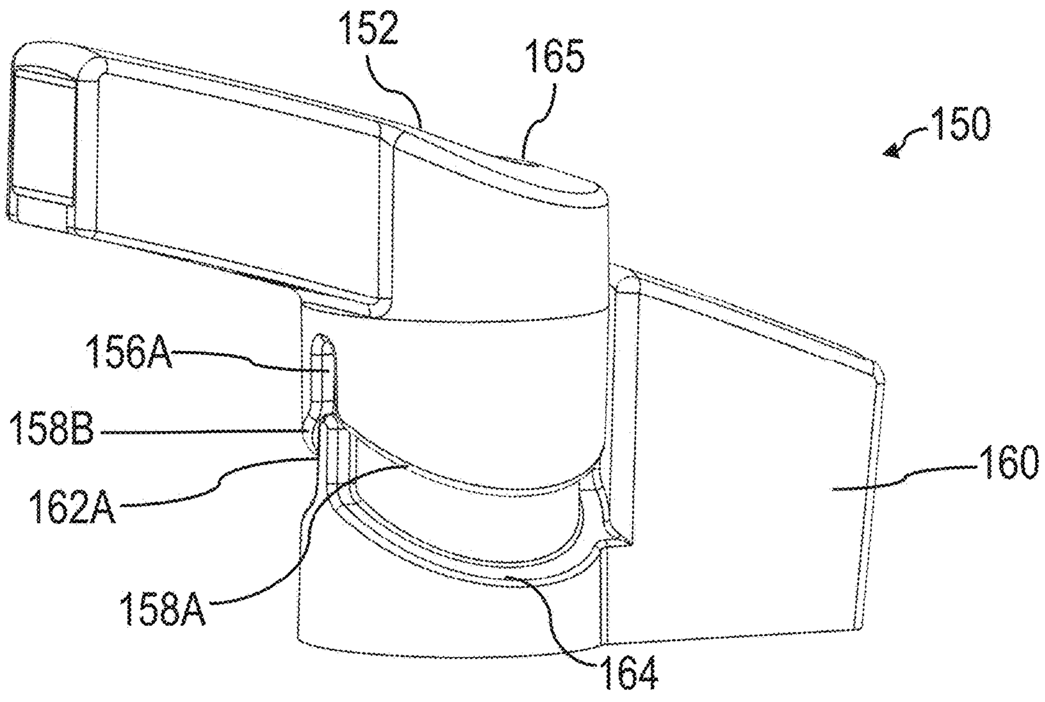
FIG. 6 is a perspective of the of the upper hinge of FIG. 2 in a second state.
Figure 7:
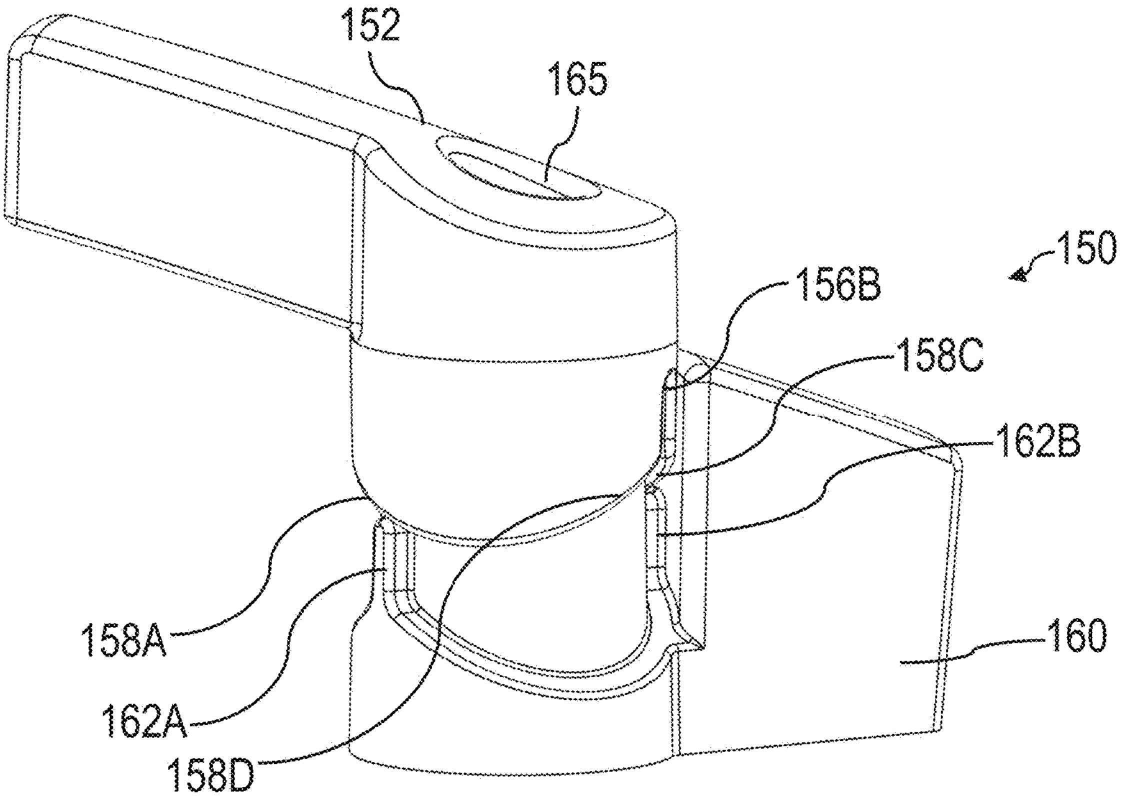
FIG. 7 is a perspective view of the upper hinge of FIG. 2 in a third state.

FIGS. 6-7 depict the upper hinge of FIGS. 2-5 in two states of operation in a process of opening an associated gate barrier compared to the first state of FIG. 2 where the upper hinge portion is in a closed position. In the second state of FIG. 6, the upper hinge portion 152 has been lifted relative to the lower hinge portion 160 from a locked position to an unlocked position. Accordingly, the first projection 162A is disengaged from the first receptacle 156A, and therefore no longer inhibits rotation of the upper hinge portion 152. As shown in FIG. 6, the first ramp 158A and the second ramp 158B are disposed adjacent the first projection 162A ready to engage the first projection when the upper hinge portion is rotated. In the third state of FIG. 7, the upper hinge portion has been rotated in a first direction from a closed position to an open position. Accordingly, the first ramp has engaged the first projection 162A. Likewise, the third ramp 158C has engaged the second projection 162B. The first ramp and the third ramp further lift the upper hinge portion 152 as the upper hinge portion rotates in the first direction. When the upper hinge portion is released in the position shown in FIG. 7, gravity and biasing force from an internal spring (see FIG. 5) may force the first ramp 158A and the third ramp 158C against the first projection 162A and second projection 162B, respectively. Due to the downward incline of the first ramp and the third ramp, the upper hinge portion may be urged to rotate back to the closed position shown in FIG. 6. Once in the closed and unlocked position shown in FIG. 6, the first projection 162A may be aligned with the first receptacle 156A and the second projection 162B may be aligned with the second receptacle such that the upper hinge portion may translate toward the lower hinge portion back to the locked position. Accordingly, the upper hinge 150 may allow automatic return of the gate from an open position shown in FIG. 7 to a closed and locked position shown in FIG. 2.

Figure 8:
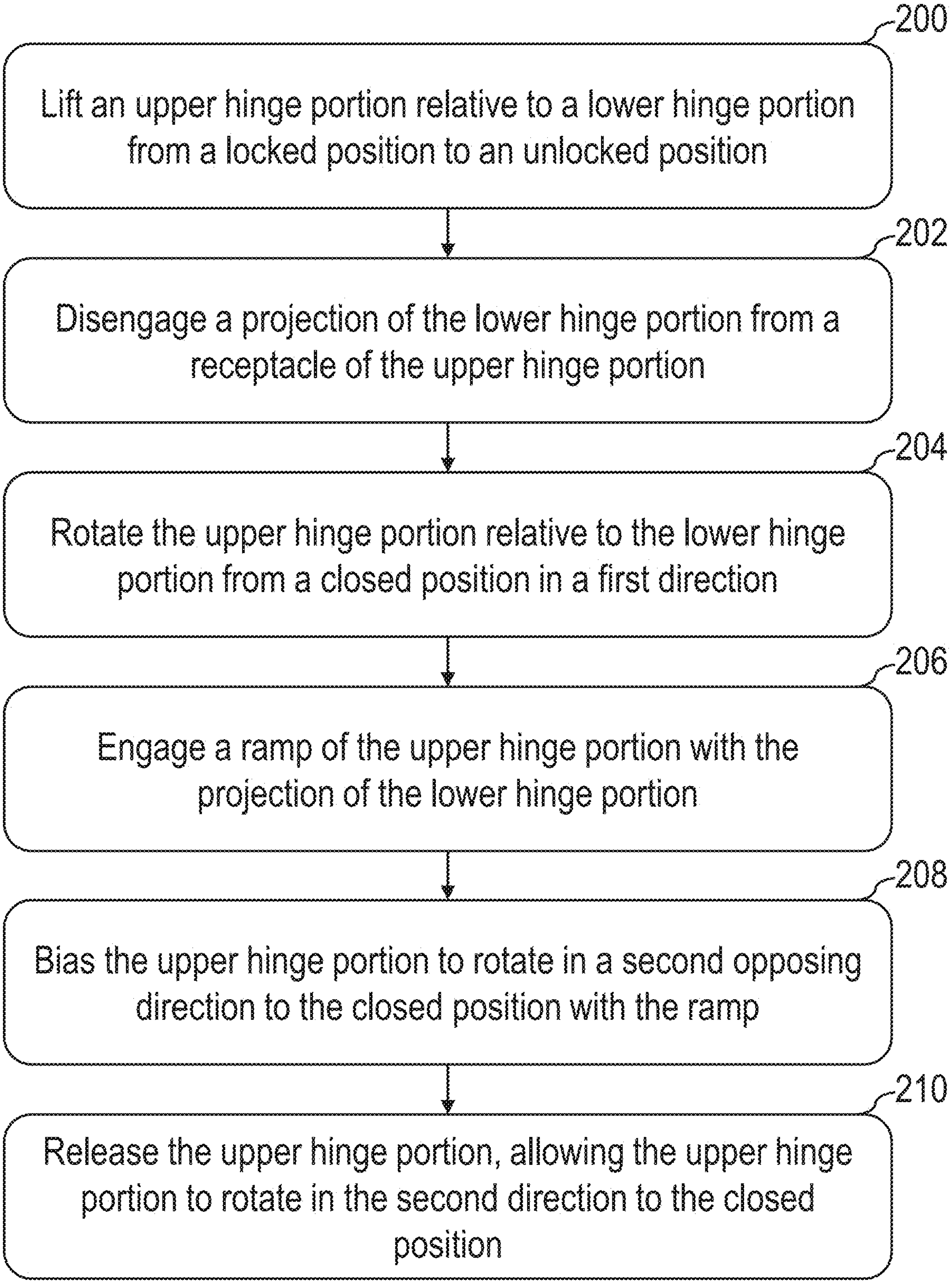
FIG. 8 is a flow chart for a method of operating a gate according to exemplary embodiments.

FIG. 8 is a flow chart for an embodiment of a method of operating a gate according to exemplary embodiments described herein. As shown in FIG. 8, in block 200 the method includes lifting an upper hinge portion relative to a lower hinge portion from a locked position to an unlocked position. The upper hinge portion and lower hinge portion may be coupled together with a fastener. In some embodiments, lifting the upper hinge portion relative to the lower hinge portion may include compressing a spring. In block 202, a projection of the lower hinge portion is disengaged from the upper hinge portion. The projection and receptacle may extend in direction parallel to an axis of rotation of the upper hinge portion, such that lifting the upper hinge portion along the rotation axis removes the projection from the receptacle. In block 204, the upper hinge portion is rotated relative to the lower hinge portion from a closed position in a first direction. In block 206, a ramp of the upper hinge portion is engaged by the projection of the lower hinge portion as the upper hinge portion rotates in the first direction. Such engagement may further lift the upper hinge portion relative to the lower hinge portion as the projection slides along the ramp. In block 208, the upper hinge portion is biased to rotate in a second opposing direction toward the closed position. The biasing may be generated by the engagement between the ramp and the projection. In block 210, the upper hinge portion is released, allowing the upper hinge portion to rotate in the second direction back to the closed position. In some embodiments, the method may also include allowing the upper hinge portion to fall from the unlocked position to the locked position when the projection is aligned with the receptacle. The movement of the upper hinge portion from the unlocked position to the locked position may re-engage the projection with the receptacle.

Figure 9:
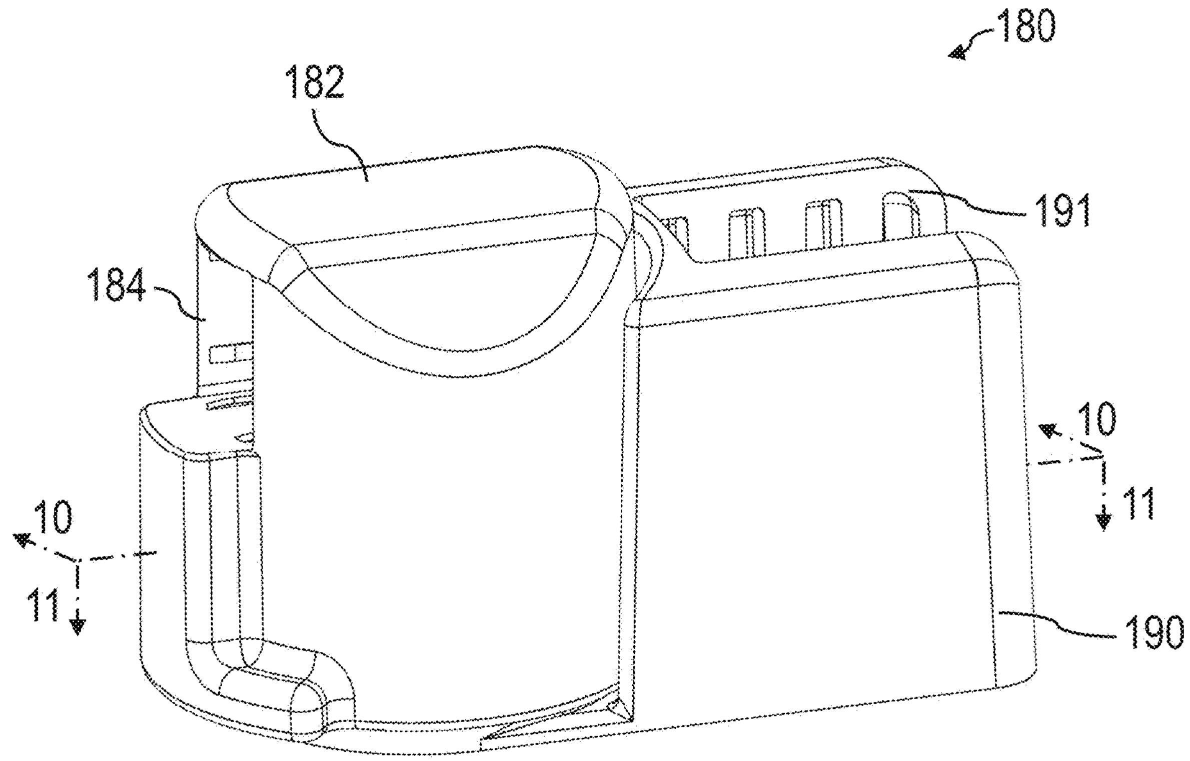
FIG. 9 is a perspective of a lower hinge of the gate of FIG. 1.

FIG. 9 is a perspective of a lower hinge 180 of the gate of FIG. 1. As shown in FIG. 9, the lower hinge includes an upper hinge portion 182 (e.g., a first portion of the lower hinge) and a lower hinge portion 190 (e.g., a second portion of the lower hinge). The upper hinge portion 182 includes a gate barrier coupler 184 configured to couple the upper hinge portion to a gate barrier. The lower hinge portion 190 includes a stile coupler 191 configured to couple the lower hinge portion to a frame of a gate. The lower hinge portion 190 is configured to support the upper hinge portion 182 to allow the upper hinge portion both rotate and translate along its rotation axis. According to the embodiment of FIG. 9, the hinge does not include any fasteners (e.g., binding posts, pins, screws, etc.). Rather, the upper hinge portion and the lower hinge portion, each of which are integrally molded, interlock to provide the functionality of the lower hinge, which is discussed further below with reference to FIGS. 10-11. Of course, in other embodiments a lower hinge may include a fastener, as the present disclosure is not so limited.

Figure 10:
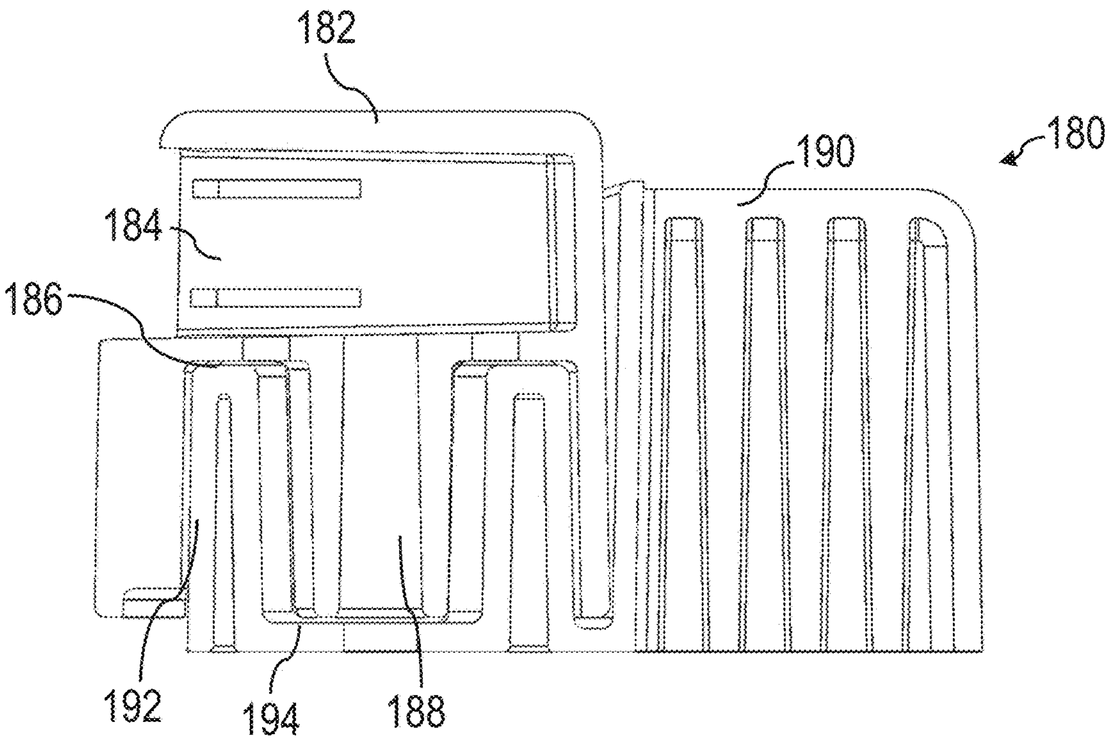
FIG. 10 is a cross-sectional view of the lower hinge of FIG. 9 taken along line 10-10.

FIG. 10 is a cross-sectional view of the lower hinge 180 of FIG. 9 taken along line 10-10. As shown in FIG. 10, the upper hinge portion 182 includes a gate barrier coupler 184. The upper hinge portion includes a receptacle 186 and a receptacle projection 188 extending from a base of the receptacle. The receptacle 186 is disposed on a bottom of the upper hinge portion and faces the lower hinge portion 190. The lower hinge portion 190 includes an annular projection 192 extending upwards toward the upper hinge portion. The annular projection is engaged with the receptacle and provides an engaging surface that supports the rotation of the upper hinge portion. The engagement between the annular projection 192 and the receptacle 186 also allows the upper hinge portion to translate away from the lower hinge portion. As shown in FIG. 10, the receptacle projection 188 is received in a center 194 of the annular projection 192. The annular projection 192 may provide an additional engaging surface supporting the rotation of the upper hinge portion. The projection may also function as a stop, as will be discussed further with reference to FIG. 11.

Figure 11:
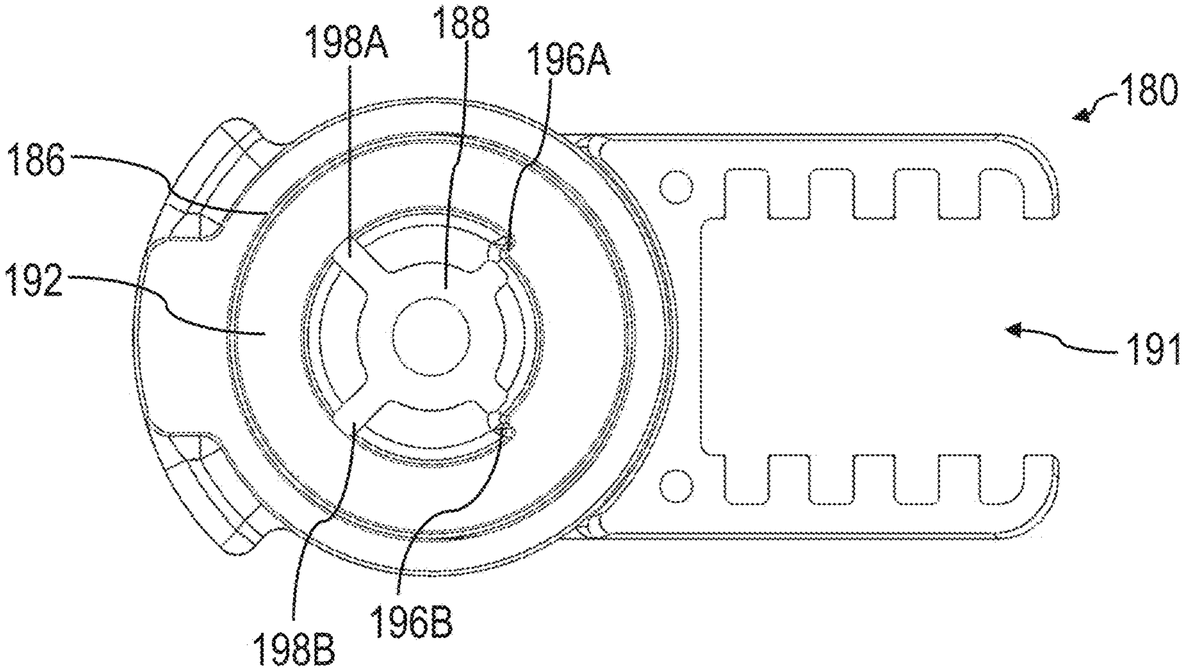
FIG. 11 is a cross-sectional view of the lower hinge of FIG. 9 taken along line 11-11.

FIG. 11 is a cross-sectional view of the lower hinge 180 of FIG. 9 taken along line 11-11. As shown in FIG. 11, the receptacle 186 surrounds the annular projection 192. The engaging surfaces between the receptacle 186 and the annular projection 192 are spaced from a rotation axis of the upper hinge portion 182. Such an arrangement strengthens the hinge compared with a hinge employing a pin or other structure without significant spacing between the axis of rotation and the engaging surfaces. As shown in FIG. 11, the receptacle projection 188 also engages the annular projection 192. The receptacle projection 188 includes a first tab 198A and a second tab 198B. The first tab and second tab are both engaged with an inner surface of the annular projection 192. As shown in FIG. 11, the annular protrusion includes a first shelf 196A and a second shelf 196B, which both extend toward the receptacle projection 188. The first shelf 196A is configured to engage the first tab 198A to inhibit further rotation of the upper hinge portion 182 in a first direction. Similarly, the second shelf 196B is configured to engage the second tab 198B to inhibit further rotation of the upper hinge portion in a second direction. Accordingly, the first shelf and the second shelf function as rotation stops for the lower hinge 180. As the receptacle projection 188 is disposed inside of the annular projection 192, the stops are not physically accessible from outside of the lower hinge 180.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A gate hinge comprising:

an upper hinge portion configured to support a gate barrier comprising:

a receptacle, and a receptacle projection extending from a base of the receptacle; and a lower hinge portion configured to support the upper hinge portion, wherein the lower hinge portion is configured to allow the upper hinge portion to rotate about a rotation axis, wherein the lower hinge portion comprises an annular projection configured to engage the receptacle, wherein the annular projection is further configured to receive the receptacle projection, wherein the annular projection comprises a first shelf disposed on an inner surface of the annular projection, wherein the receptacle projection comprises a first tab configured to engage the first shelf to inhibit rotation in a first direction.

2. The gate hinge of claim 1, wherein the annular projection comprises a second shelf disposed on the inner surface of the annular projection, wherein the receptacle projection comprises a second tab configured to engage the second shelf to inhibit rotation in a second direction opposite the first direction.

3. The gate hinge of claim 2, wherein the upper hinge portion is configured to rotate relative to the lower hinge portion in the first direction from a closed position to a first open position defined by engagement of the first tab with the first shelf, and wherein the upper hinge portion is configured to rotate relative to the lower hinge portion in the second direction from the closed position to a second open position defined by engagement of the second tab with the second shelf.

4. The gate hinge of claim 3, wherein an angle between the closed position and the first open position is between 80 and 90 degrees, and wherein an angle between the closed position and the second open position is between 80 and 90 degrees.

5. A gate comprising:

a gate barrier;

an upper hinge configured to rotatably support the gate barrier about a rotation axis, the upper hinge comprising:

a first upper hinge portion coupled to the gate barrier, the first upper hinge portion comprising a first receptacle, and a first ramp disposed adjacent the first receptacle, wherein the first ramp is inclined downward away from the first receptacle in a first direction, and a second upper hinge portion configured to support the first upper hinge portion, wherein the second upper hinge portion is configured to allow the first upper hinge portion to rotate about a rotation axis and translate along the rotation axis, wherein the second upper hinge portion comprises a first upper hinge projection configured to engage the first receptacle to inhibit relative rotation of the first upper hinge portion and the second upper hinge portion; and a lower hinge configured to rotatably support the gate barrier about the rotation axis, the lower hinge comprising:

a first lower hinge portion coupled to the gate barrier, the first lower hinge portion comprising a receptacle and a lower hinge projection extending from a base of the receptacle, and a second lower hinge portion configured to support the first lower hinge portion, wherein the second lower hinge portion comprises an annular projection configured to engage the receptacle, wherein the annular projection is further configured to receive the lower hinge projection.

6. The gate of claim 5, wherein the first upper hinge projection is configured to engage the first receptacle in a direction parallel to the rotation axis.

7. The gate of claim 5, wherein the first upper hinge portion further comprises a second receptacle and a second ramp disposed adjacent the second receptacle, and wherein the second upper hinge portion further comprises a second upper hinge projection configured to engage the second receptacle to inhibit relative rotation of the first upper hinge portion and the second upper hinge portion.

8. The gate of claim 7, wherein the first receptacle and the second receptacle are disposed on opposite sides of the rotation axis, and wherein the first upper hinge projection and the second upper hinge projection are disposed on opposite sides of the rotation axis.

9. The gate of claim 7, wherein the first upper hinge portion comprises an upper hinge barrel disposed around the rotation axis, wherein the second upper hinge portion comprises a lower hinge barrel disposed around the rotation axis, wherein the first receptacle is disposed on an exterior of the upper hinge barrel, and wherein the first upper hinge projection is disposed on an exterior of the lower hinge barrel.

10. The gate of claim 9, wherein the lower hinge barrel comprises a mating profile configured to engage the first ramp and the second ramp when the first upper hinge projection is engaged with the first receptacle, wherein the mating profile is configured to eliminate gaps between the upper hinge barrel and the lower hinge barrel.

11. The gate of claim 7, wherein the first upper hinge projection is configured to engage the first ramp when the first upper hinge portion is rotated relative to the second upper hinge portion in the first direction from a closed position, and wherein the first upper hinge projection is configured to engage the second ramp when the first upper hinge portion is rotated relative to the second upper hinge portion in a second direction opposite the first direction from the closed position.

12. The gate of claim 11, wherein the first ramp is configured to translate the first upper hinge portion away from the second upper hinge portion when the first upper hinge portion is rotated in the first direction, and wherein the second ramp is configured to translate the first upper hinge portion away from the second upper hinge portion when the first upper hinge portion is rotated in the second direction.

13. The gate of claim 11, wherein the first ramp is configured to engage the first upper hinge projection over at least an 85 degree rotation in the first direction from the closed position, and wherein the second ramp is configured to engage the first upper hinge projection over at least an 85 degree rotation in the second direction from the closed position.

14. The gate of claim 11, wherein the first ramp is configured to bias the first upper hinge portion toward the closed position when engaged with the first upper hinge projection, and wherein the second ramp is configured to bias the first upper hinge portion toward the closed position when engaged with the first upper hinge projection.

15. The gate of claim 5, further comprising a fastener coupling the first upper hinge portion to the second upper hinge portion defining the rotation axis, wherein the fastener is configured to limit translation of the first upper hinge portion relative to the second upper hinge portion about the rotation axis.

16. The gate of claim 15, further comprising a compression spring configured to bias the first upper hinge portion into engagement with the second upper hinge portion, wherein the compression spring is disposed on the fastener and configured to apply force between a head of the fastener and an upper surface of the first upper hinge portion.

17. The gate of claim 5, wherein the first upper hinge portion is configured to translate between a locked position and an unlocked position, wherein in the locked position the first upper hinge projection is engaged with the first receptacle, and wherein in the unlocked position the first upper hinge projection is not engaged with the first receptacle and the first upper hinge portion is allowed to rotate about the rotation axis.

18. The gate of claim 5, wherein the first upper hinge portion is integrally molded, and wherein the second upper hinge portion is integrally molded.

* * * * *